(12) United States Patent
Armitano et al.

(10) Patent No.: US 7,778,981 B2
(45) Date of Patent: Aug. 17, 2010

(54) POLICY ENGINE TO CONTROL THE SERVICING OF REQUESTS RECEIVED BY A STORAGE SERVER

(75) Inventors: Robert M. Armitano, Palo Alto, CA (US); Dejan L. Mihajlovic, Sunnyvale, CA (US); Mark Muhlestein, Tucson, AZ (US); Timothy J. Thompson, San Jose, CA (US); James T. Uren, Mountain View, CA (US); Alan G. Yoder, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 1119 days.

(21) Appl. No.: 10/777,418

(22) Filed: Feb. 11, 2004

(65) Prior Publication Data

US 2004/0230795 A1 Nov. 18, 2004

Related U.S. Application Data

(63) Continuation-in-part of application No. 10/010,959, filed on Nov. 30, 2001, now Pat. No. 7,523,487, which is a continuation-in-part of application No. 09/728,701, filed on Dec. 1, 2000, now Pat. No. 7,346,928.

(51) Int. Cl.
G06F 7/00 (2006.01)
G06F 15/173 (2006.01)
(52) U.S. Cl. ..................... 707/694; 709/224
(58) Field of Classification Search .............. 707/204, 707/205
See application file for complete search history.

(56) References Cited

U.S. PATENT DOCUMENTS 4,104,718 A   8/1978   Poublan et al.
4,937,763 A   6/1990   Mott
5,067,099 A   11/1991  McCown et al.
5,138,712 A * 8/1992   Corbin ........................ 726/30
5,261,051 A   11/1993  Masden et al.
5,392,446 A   2/1995   Tower et al.
5,396,609 A   3/1995   Schmidt et al.

(Continued)

FOREIGN PATENT DOCUMENTS

| EP | 0 903 901 | 3/1999 |
| EP | 1100001 A2 * | 5/2001 |
| JP | 2004-523820 | 6/2002 |
| JP | 2004523820 | 8/2006 |
| WO | WO 97/39399 | 10/1997 |

(Continued)

OTHER PUBLICATIONS

"Storsge Management Solutions for Distributed Computing Environments", authors Reiner Lomb, Kelly A Emo and Roy M VanDoorn Oct. 19996 Hwlett-Packard Journal.*

"Storage Management Solutions for Distributed Computing Environments" Dated Oct. 9, 1996, authors: Reinner Lomb, Kelly A. Emo and Roy M. VanDoorn, pp. 1-12.*

(Continued)

*Primary Examiner*—Neveen Abel Jalil
*Assistant Examiner*—Tarek Chbouki
(74) *Attorney, Agent, or Firm*—Perkins Coie LLP (57) ABSTRACT

Certain tasks are outsourced from a filer to a remote policy engine. The policy engine implements various defined policies to control the filer's servicing of client requests. For example, the policy engine can be used to implement policies to control various storage-related operations relating to data managed by a filer, such as creation, deletion, modification, opening, closing, renaming and/or changing attributes of files or directories managed by the filer.

34 Claims, 4 Drawing Sheets

U.S. PATENT DOCUMENTS

| | | | |
|---|---|---|---|
| 5,604,862 A | 2/1997 | Midgely et al. | |
| 5,623,600 A | 4/1997 | Ji et al. | |
| 5,630,049 A | 5/1997 | Cardoza et al. | |
| 5,649,099 A * | 7/1997 | Theimer et al. | 726/4 |
| 5,649,152 A | 7/1997 | Ohran et al. | |
| 5,682,535 A * | 10/1997 | Knudsen | 717/117 |
| 5,771,354 A | 6/1998 | Crawford | |
| 5,787,409 A | 7/1998 | Seiffert et al. | |
| 5,819,047 A * | 10/1998 | Bauer et al. | 709/229 |
| 5,819,292 A | 10/1998 | Hitz et al. | |
| 5,835,953 A | 11/1998 | Ohran | |
| 5,918,008 A | 6/1999 | Togawa et al. | |
| 5,925,126 A | 7/1999 | Hsieh | |
| 5,933,594 A | 8/1999 | La Joie et al. | |
| 5,946,690 A | 8/1999 | Pitts | |
| 5,963,962 A | 10/1999 | Hitz et al. | |
| 5,968,176 A | 10/1999 | Nessett et al. | |
| 6,014,700 A * | 1/2000 | Bainbridge et al. | 709/226 |
| 6,061,504 A * | 5/2000 | Tzelnic et al. | 709/219 |
| 6,076,105 A * | 6/2000 | Wolff et al. | 709/223 |
| 6,088,803 A | 7/2000 | Tso et al. | |
| 6,101,558 A | 8/2000 | Utsunomiya et al. | |
| 6,108,785 A | 8/2000 | Poisner | |
| 6,115,741 A | 9/2000 | Dominekos et al. | |
| 6,138,126 A | 10/2000 | Hitz et al. | |
| 6,148,349 A * | 11/2000 | Chow et al. | 710/33 |
| 6,185,598 B1 * | 2/2001 | Farber et al. | 709/200 |
| 6,189,114 B1 | 2/2001 | Orr | |
| 6,226,752 B1 | 5/2001 | Gupta et al. | |
| 6,230,200 B1 * | 5/2001 | Forecast et al. | 709/226 |
| 6,237,114 B1 | 5/2001 | Wookey et al. | |
| 6,253,217 B1 * | 6/2001 | Dourish et al. | 715/500 |
| 6,256,773 B1 * | 7/2001 | Bowman-Amuah | 717/121 |
| 6,266,774 B1 | 7/2001 | Sampath et al. | |
| 6,275,393 B1 | 8/2001 | Baudelot et al. | |
| 6,275,939 B1 | 8/2001 | Garrison | |
| 6,311,213 B2 * | 10/2001 | Dawson et al. | 709/217 |
| 6,324,581 B1 * | 11/2001 | Xu et al. | 709/229 |
| 6,327,594 B1 * | 12/2001 | Van Huben et al. | 707/200 |
| 6,327,658 B1 | 12/2001 | Susaki et al. | |
| 6,327,677 B1 | 12/2001 | Garg et al. | |
| 6,338,141 B1 | 1/2002 | Wells | |
| 6,401,126 B1 * | 6/2002 | Douceur et al. | 709/231 |
| 6,405,327 B1 | 6/2002 | Sipple et al. | |
| 6,490,666 B1 * | 12/2002 | Cabrera et al. | 711/161 |
| 6,502,102 B1 * | 12/2002 | Haswell et al. | 707/102 |
| 6,519,679 B2 * | 2/2003 | Devireddy et al. | 711/114 |
| 6,523,027 B1 * | 2/2003 | Underwood | 707/4 |
| 6,542,967 B1 * | 4/2003 | Major | 711/134 |
| 6,560,632 B1 | 5/2003 | Chess et al. | |
| 6,577,636 B1 * | 6/2003 | Sang et al. | 370/395.7 |
| 6,606,744 B1 * | 8/2003 | Mikurak | 717/174 |
| 6,697,846 B1 * | 2/2004 | Soltis | 709/217 |
| 6,721,721 B1 | 4/2004 | Bates et al. | |
| 6,721,862 B2 * | 4/2004 | Grant et al. | 711/162 |
| 6,728,766 B2 * | 4/2004 | Cox et al. | 709/220 |
| 6,757,753 B1 * | 6/2004 | DeKoning et al. | 710/38 |
| 6,757,794 B2 * | 6/2004 | Cabrera et al. | 711/156 |
| 6,785,732 B1 | 8/2004 | Bates et al. | |
| 6,801,949 B1 | 10/2004 | Bruck et al. | |
| 6,802,012 B1 | 10/2004 | Smithson et al. | |
| 6,832,313 B1 * | 12/2004 | Parker | 713/150 |
| 6,859,841 B2 * | 2/2005 | Narad et al. | 709/236 |
| 6,918,113 B2 | 7/2005 | Patel et al. | |
| 6,931,540 B1 | 8/2005 | Edwards et al. | |
| 6,970,939 B2 * | 11/2005 | Sim | 709/236 |
| 6,981,070 B1 * | 12/2005 | Luk et al. | 710/5 |
| 7,020,697 B1 * | 3/2006 | Goodman et al. | 709/223 |
| 7,032,022 B1 * | 4/2006 | Shanumgam et al. | 709/225 |
| 7,089,293 B2 * | 8/2006 | Grosner et al. | 709/217 |
| 7,124,180 B1 * | 10/2006 | Ranous | 709/224 |
| 7,127,388 B2 * | 10/2006 | Yates et al. | 703/24 |
| 7,146,377 B2 * | 12/2006 | Nowicki et al. | 707/102 |
| 7,237,027 B1 * | 6/2007 | Raccah et al. | 709/226 |
| 7,293,083 B1 * | 11/2007 | Ranous et al. | 709/224 |
| 7,349,960 B1 * | 3/2008 | Pothier et al. | 709/224 |
| 7,555,482 B2 | 6/2009 | Korkus | |
| 2001/0013059 A1 * | 8/2001 | Dawson et al. | 709/217 |
| 2001/0013064 A1 * | 8/2001 | Cox et al. | 709/220 |
| 2002/0040405 A1 * | 4/2002 | Gold | 709/231 |
| 2002/0042866 A1 * | 4/2002 | Grant et al. | 711/162 |
| 2002/0065946 A1 * | 5/2002 | Narayan | 709/315 |
| 2002/0087479 A1 * | 7/2002 | Malcolm | 705/64 |
| 2002/0103783 A1 | 8/2002 | Muhlestein | |
| 2002/0103907 A1 * | 8/2002 | Petersen | 709/226 |
| 2002/0120741 A1 * | 8/2002 | Webb et al. | 709/225 |
| 2002/0124090 A1 * | 9/2002 | Poier et al. | 709/228 |
| 2002/0133491 A1 * | 9/2002 | Sim et al. | 707/10 |
| 2002/0133561 A1 * | 9/2002 | O'Brien et al. | 709/213 |
| 2002/0161855 A1 * | 10/2002 | Manczak et al. | 709/219 |
| 2002/0194251 A1 * | 12/2002 | Richter et al. | 709/105 |
| 2003/0031176 A1 * | 2/2003 | Sim | 370/392 |
| 2003/0046396 A1 * | 3/2003 | Richter et al. | 709/226 |
| 2003/0056069 A1 * | 3/2003 | Cabrera et al. | 711/161 |
| 2003/0120476 A1 * | 6/2003 | Yates et al. | 703/24 |
| 2003/0191957 A1 | 10/2003 | Hypponen et al. | |
| 2003/0195895 A1 * | 10/2003 | Nowicki et al. | 707/100 |
| 2003/0236745 A1 * | 12/2003 | Hartsell et al. | 705/40 |
| 2004/0024688 A1 * | 2/2004 | Bi et al. | 705/37 |
| 2004/0044744 A1 * | 3/2004 | Grosner et al. | 709/217 |
| 2004/0078419 A1 * | 4/2004 | Ferrari et al. | 709/201 |
| 2004/0148382 A1 * | 7/2004 | Narad et al. | 709/223 |
| 2004/0186844 A1 | 8/2004 | Muhlestein | |
| 2004/0226010 A1 | 11/2004 | Suorsa | |
| 2004/0230795 A1 * | 11/2004 | Armitano et al. | 713/165 |
| 2005/0138204 A1 * | 6/2005 | Iyer et al. | 709/242 |
| 2005/0198238 A1 * | 9/2005 | Sim et al. | 709/222 |
| 2005/0203881 A1 | 9/2005 | Sakamoto et al. | |
| 2005/0226153 A1 | 10/2005 | Scifres et al. | |
| 2005/0251500 A1 * | 11/2005 | Vahalia et al. | 707/1 |
| 2006/0195616 A1 * | 8/2006 | Petersen | 709/250 |
| 2008/0027746 A1 * | 1/2008 | Exall et al. | 705/1 |
| 2008/0066151 A1 * | 3/2008 | Thomsen et al. | 726/1 |

FOREIGN PATENT DOCUMENTS

| | | |
|---|---|---|
| WO | WO 97/49252 | 12/1997 |
| WO | PCT/US01/46688 | 11/2001 |
| WO | WO 02/44862 A2 | 6/2002 |
| WO | WO 02/095588 A2 | 11/2002 |

OTHER PUBLICATIONS

Jieh-Sheng Lee "A Generic Virus Detection Agent on the Internet" System Sciences, 1997, pp. 210-219, vol. 4 Center of Computing Services, Hua-Fan Institute of Technology, Shi-Tang, Taipei, Taiwan.

PCT Search Report; PCT/US0146688; Sep. 22, 2006.

PCT Search Report; PCT/US0151581; Oct. 10, 2006.

Northern, Peter, et al. "Chapter 3—Norton Utilities: The System Doctor Is In." and "Chapter 13—Norton Utilities: The Better Part of Valor . . . ," Peter Norton's Complete Guide to Norton SystemWorks 2.0, 1999, Sams.

Wybranietz, D. et al. "Monitoring and Performance Measuring Distributed Systems During Operation." Joint International Conference on Measurement and Modeling of Computer System, 1988, pp. 197-206, ACM Press, New York, NY.

Slashdot.com: Tux2: The Filesystem That Would Be King—Microsoft Internet Explorer Oct. 20, 2000.

iCap Forum, "iCap—FAQ's and Answers", http://www.i-cap.org/icap/faqs.cfm., Jul. 13, 2001, 2 pages.

Norton, Peter, et al., "Chapter 3—Norton Utilities: The System Doctor Is In", Peter Norton's Complete Guide to Norton SystemWorks 2.0, 38 pages.

Slashdot, "Slashdot—Tux2: The Filesystems That Would Be . . . —Microsoft Internet Explorer", Oct. 20, 2000, 16 pages.

Network Appliance, Inc., "Data ONTAP Event Management System", Aug. 10, 2000, 19 pages.

Gud, Amit, et al., Elastic Quota File System (EQFS), : Department of D.Y. Patil College of Engg, Dec. 4, 2005, downloaded from http://people.cis.ksu.edu/~gud/docs/ppt/eqfs_ppt.pdf, 20 pages.

Leach, P., et al., "A Universally Unique Identifier (UUID) URN Namespace," The Internet Society, Jul. 2005, downloaded from http://www.ietf.org/rfc/rfc4122.txt on Aug. 9, 2007, 23 pages.

"IT Value Card Published: Dec. 2005, Microsoft File Server Resource Manager," Microsoft Corporation, Dec. 2005, 2 pages.

Co-pending U.S. Appl. No. 11/862,140, filed Sep. 26, 2007.

Co-pending U.S. Appl. No. 11/862,136, filed Sep. 26, 2007.

Co-pending U.S. Appl. No. 11/862,137, filed Sep. 26, 2007.

* cited by examiner

POLICY ENGINE TO CONTROL THE SERVICING OF REQUESTS RECEIVED BY A STORAGE SERVER

This is a continuation-in-part of U.S. patent application Ser. No. 10/010,959 of M. Muhlestein, filed on Nov. 30, 2001 and entitled, "Decentralized Virus Scanning for Stored Data" (hereinafter "Muhlestein"), which is a continuation-in-part of U.S. patent application Ser. No. 09/728,701 filed on Dec. 1, 2000 and entitled, "Decentralized Appliance Virus Scanning," both of which are incorporated herein by reference.

FIELD OF THE INVENTION

At least one embodiment of the present invention pertains to data storage systems, and more particularly, to a policy engine to control the servicing of requests received by a storage server.

BACKGROUND

Modern computing systems often employ various types of storage servers. Storage servers are used for a variety of purposes, such as to provide multiple users with access to shared data and to back up mission critical data. A file server, for example, is a type of storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One configuration in which a file server can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the Filer products made by Network Appliance, Inc. in Sunnyvale, Calif.

A storage server can also be employed in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Some storage servers, such as certain Filers from Network Appliance, are capable of operating in either a NAS mode or a SAN mode or even both modes at the same time. Such dual-use devices are sometimes referred to as "unified storage" devices.

It is desirable to allow third parties software developers to develop applications that can access and/or control processes that run on a filer. Doing so can enhance and add value to such devices. However, development of such applications by third parties can be costly and complicated and risk having an unintended negative impact on other processes of the storage server. As a result, relatively few third party applications are available at present. It is desirable, therefore, to facilitate the development of such third party applications, without requiring that all such applications be developed by one company, while reducing the risk of a negative impact on the storage server.

SUMMARY OF THE INVENTION

The present invention includes a method of operating a storage server. The storage server receives from a client a request to perform a storage-related operation relating to a set of data. If the first request satisfies a defined criterion, the storage server invokes a policy engine configured to determine a disposition of the request. The storage server then receives a response from the policy engine indicating a disposition of the request and responds to the request in accordance with the response from the policy engine.

Another aspect of the invention is a method of operating a policy engine. The policy engine receives a first request and information relating to a set of data from a storage server. The first request is in response to a storage-related client request received by the storage server from a client and relating to the set of data. The policy engine applies a defined policy using the information relating to a set of data and then sends a first response to the storage server to indicate a result of applying the defined policy. The first response is to cause the storage server to send a second response to the client in accordance with the first response.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for controlling the servicing of requests received by a storage server are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

It is desirable to increase the number and capability of applications that enhance the functionality of a filer, without requiring that all such applications be developed by one company. To accomplish this, an interface that allows independent software developers to create applications that access and control processes that run on a filer is needed. Such an interface allows isolation of development and features to reduce any negative impact on the filer, while still allowing control of significant features in the filer, thus allowing third parties to add value to the filer.

In this regard, note that Muhlestein (referenced in full above) describes a technique for "outsourcing" from a filer various tasks, such as virus scanning, data compression/decompression, encryption/detection, database compaction, data translation, or any of various other CPU intensive tasks. In particular, Muhlestein describes the use of a "cluster device" to perform such tasks on behalf of a filer. As described further below, the technique described in Muhlestein can be extended, modified and/or generalized advantageously to achieve the above-noted goal.

Described herein is a technique for outsourcing certain tasks from a filer to a policy engine (which can be a device similar to a cluster device such as described in Muhlestein). The policy engine is, in certain embodiments, a dedicated application server used to implement various defined policies to control a filer's servicing of client requests. For example, the policy engine can be used to implement policies to control various storage-related operations relating to data managed by the filer. The controlled operations may include, for example, creation, deletion, modification, opening, closing, renaming and/or changing attributes of files or directories managed by the filer.

Figure 1:
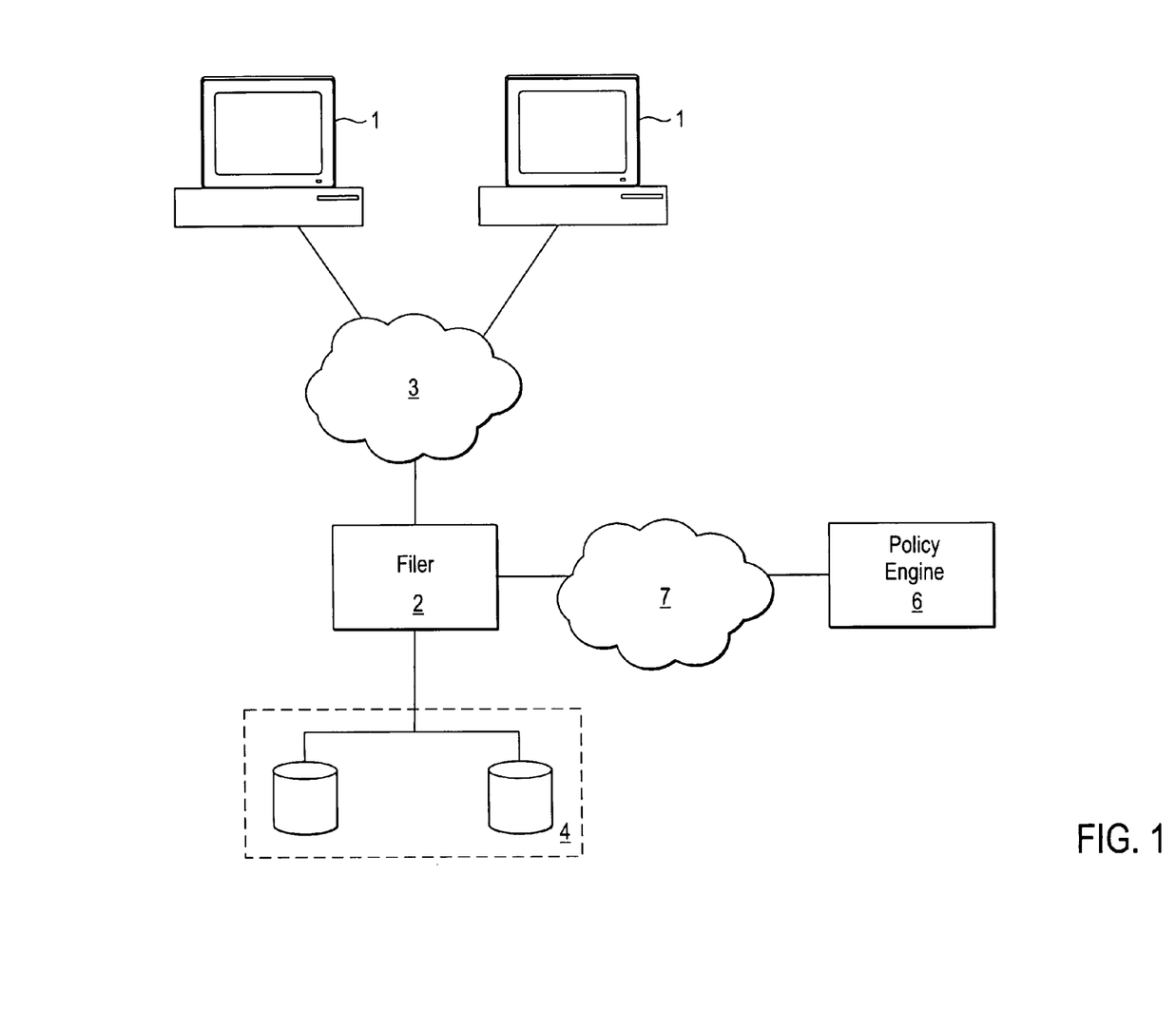
FIG. 1 illustrates an example of a networked storage system in which the invention can be implemented.

A simple example of a networked storage system is illustrated in FIG. 1. The storage system includes a filer 2 coupled locally to a set of mass storage devices 4, and to a set of clients 1 through an interconnect 3. The filer 2 receives various read and write requests from the clients 1 and accesses the mass storage devices 4 to service those requests. Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data.

The filer 2 is capable of operating in either a NAS mode or a SAN mode, or both; that is, the filer to can provide either file-level access or block-level access to stored data. The filer 2 implements a number of different storage protocols, such as the common Internet file system (CIFS), network file system (NFS), hypertext transport protocol (HTTP), simple network management protocol (SNMP), etc., and selectively uses these protocols as needed.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The storage system also includes a remote policy engine 6, which is connected to the filer through an interconnect 7 (which can be the same interconnect as interconnect 3). Interconnect 7 may be, for example, a conventional computer network, such as a LAN or a corporate intranet. The term "remote", in this context, means that the policy engine 6 is external to the filer 2 and is connected to the filer 2 only indirectly, such as through a network. However, the term "remote" does not imply that the actual physical separation between the filer 2 and the policy engine 6 must be large; in fact, the physical separation between these devices can be quite small. Furthermore, it should be noted that the operations described herein as being performed by the policy engine 6 could instead be implemented internally to the filer.

In general terms, the role of the policy engine 6 is to control the servicing of certain requests received by the filer 2 from clients 1, by implementing various predefined policies. The operating system in the filer 2 includes an application programming interface (API) that allows the filer 2 to interface with the policy engine 6, as described further below. The policy engine 6 and the associated API in the filer 2 allow third party control of various processes of the filer 2. For example, the policy engine 6 can be used to implement policies to control various storage-related operations on files by the filer 2, such as creating, opening, closing, deleting, modifying, renaming and/or changing attributes of files.

Each policy can be implemented in the policy engine 6 in the form of a simple software algorithm. A few examples of policies that can be implemented in a policy engine 6 are:

block creation of files of a particular file type deny a particular user access to data stored in a particular disk or volume limit certain users' access to a particular file, disk or volume to a specified number of times per day apply a load balancing procedure to any data accessed more than a specified number of times in a specified period of time.

The policies may be defined/installed or enabled within the policy engine 6 by a network administrator during a configuration process, via a separate management console (not shown). Similarly, the filer 2 can also be configured/managed via a separate management console.

It might be desirable to block the creation of certain types of files, at least under certain conditions. For example, MP3 files tend to consume large amounts of storage space, such that it may be desirable not to give users unlimited freedom to store such files on the storage system. Consequently, a policy can be defined and implemented in the policy engine 6 to cause the policy engine 6 to block creation of MP3 files (or any other specified type of file), either unconditionally or under specified conditions. A policy may be applied only to certain users or to certain client machines or groups of user/clients, for example, or only during certain times of today, etc.

Thus, the policy engine 6 can be used to implement policies to control essentially any storage-related operation of the filer 2, based on any of various criteria, such as filename, file type (e.g., file extension), the user or client which initiated the request, disk usage, specified quotas, etc., or any combination thereof. Further, the policy engine 6 can be used to collect and maintain summaries of attributes of data, such as keeping and running track of directory usage. The summarized data can be used by heuristics which implement the policies within the policy engine 6.

At startup, the policy engine 6 gets the name of the filer(s) 2 it will be serving from a command line interface or some other invocation interface. The policy engine 6 communicates with the filer 2 using a named pipe and registers itself with the filer 2 as a policy engine 6. The policy engine 6 then tells the filer 2 which communication method it will be using and which file operation(s) to screen. Separate named pipes are created for communications from the filer 2 to the policy engine 6 ("screen requests") and for communications from the policy engine 6 to the filer 2 ("screen responses").

As part of the registration process, the policy engine 6 causes the filer 2 to store a set of criteria for each policy the policy engine 6 will implement. The criteria, when satisfied by a client request, will trigger the filer 2 to invoke the policy engine 6 with a "screen request". When a client-initiated request received by the filer 2 meets any such set of criteria, the filer 2 defers to the policy engine 6 for disposition of the request, rather than immediately attempting to satisfy the request. For example, a set of criteria which the policy engine 6 registers with the filer 2 might essentially tell the filer 2, "Notify me (the policy engine 6) before servicing any request to create an MP3 file." When the criteria are met, the filer 2 sends no response to the requesting client until the policy engine 6 has provided a response to the filer 2; hence, the policy engine's servicing of screen requests from the filer 2 is synchronous with the filer's servicing of client requests. If a negative response is received from the policy engine 6 or if the response time exceeds a predefined limit, the request from the client 1 will be denied.

In one embodiment, the criteria examined for purposes of generating screen requests are implemented as filters. In this embodiment, the filer 2 sends a screen request only if a certain feature of a file is matched (or not matched). The filer 2 in this embodiment acts to filter out request that are not relevant to the policy on the policy engine 6, reducing the communication required between the filer 2 and policy engine 6. For example, the filer 2 can send screen requests based on filters on file extensions, metadata attributes (e.g., an "offline" bit), or file attributes (file size, file age, etc.).

Figure 2:
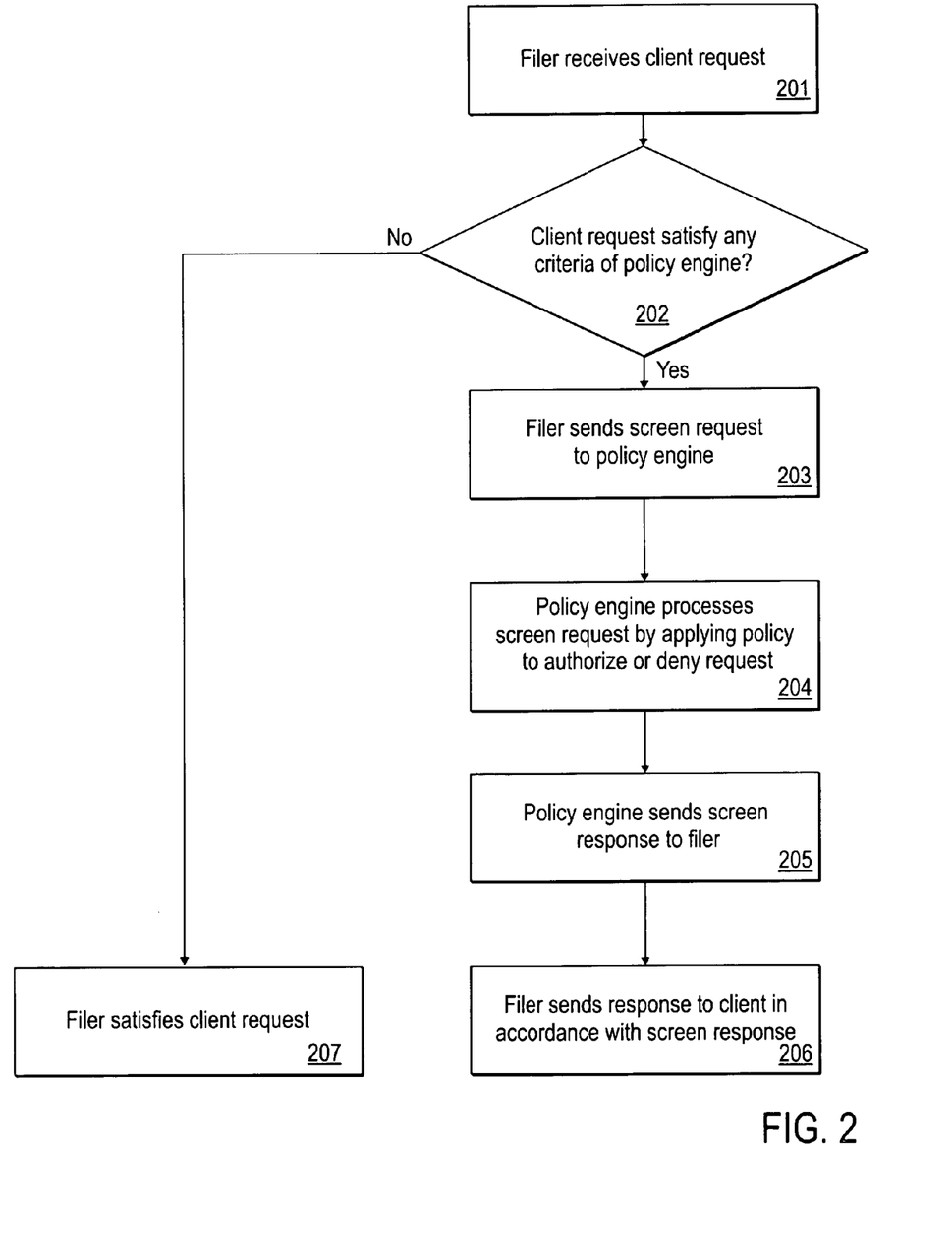
FIG. 2 is a flow diagram of a process performed by a filer and a policy engine in accordance with the invention.

FIG. 2 illustrates a process performed by the filer 2 and the policy engine 6 according to certain embodiments of the invention. Initially, at 201 the filer 2 receives from one of its clients 1 a request to perform a storage-related operation relating to a set of data managed (or to be managed) by the filer 2. The data may be, for example, a file, as now assumed for the sake of simplicity. The request may be, for example, a request to create, open, or modify a file. At 202 the filer 2 determines whether the client request satisfies any of the previously stored criteria of the policy engine 6. If none of the criteria of the policy engine 6 are satisfied, then at 207 the filer 2 simply attempts to satisfy the request and does not invoke the policy engine 6. If any of the criteria of the policy engine 6 are satisfied, the filer 2 generates a "screen request" and sends the screen request by Remote Procedure Call (RPC) to the policy engine 6 at 203 to invoke the policy engine 6. The screen request is a notification to the policy engine 6 that criteria associated with one of the policy engine's defined policies have been met by the request.

With the screen request, the filer 2 also sends to the policy engine 6 information relating to the file, such as metadata of the file, e.g., canonical names for the file, the file extension of the file, the access type, user name of the requesting user, etc. The policy engine 6 may also set or modify such metadata of files managed by the filer 2, for later use. The information sent to the policy engine 6 with a particular screen request will depend upon which set of criteria the client request matched, and the criteria depend upon the policy with which they are associated. For example, if the matched criteria are based on the underlying policy of blocking creation of MP3 files, the filer 2 may include the MP3 file extension in the screen request.

In another example, the policy engine 6 is used to provide functionality that dynamically modifies information that is displayed to a client application based on a user credential or process ID. The filer 2 transfers to the policy engine 6, the identity of the client, process ID, or other user-centric attribute when a file is accessed. The file transformation is then carried out by the policy engine 6 or systems called by it. This functionality takes advantage of the synchronous nature of filer-to-policy-engine communication.

The policy engine 6 receives the screen request and the information relating to the file from the filer 2. At 204 the policy engine 6 applies the appropriate one or more of its defined policies to the received information. The result of applying the policy may be a decision by the policy engine 6 to approve or deny the request. To simplify description, it is generally assumed herein that the result of applying the policy is either approval or denial of the client request. Note, however, that the result of applying the policy can be something other than approval or denial of the request; in other words, the policy engine 6 can perform, or can cause the filer 2 or some other device to perform, some other predetermined action.

After applying the policy (or multiple policies), the policy engine 6 sends a screen response by RPC to the filer 2 at 205 to indicate the result. At 206 the filer 2 sends a response in accordance with the screen response to the client 1 which made the original request. For example, if the screen response was to approve the client request, the filer 2 satisfies the client request (in the current example, the filer 2 would allow creation of the file per the client request). If the screen response was to deny the request, the filer 2 sends the client a message indicating that the request was denied.

Figure 3:
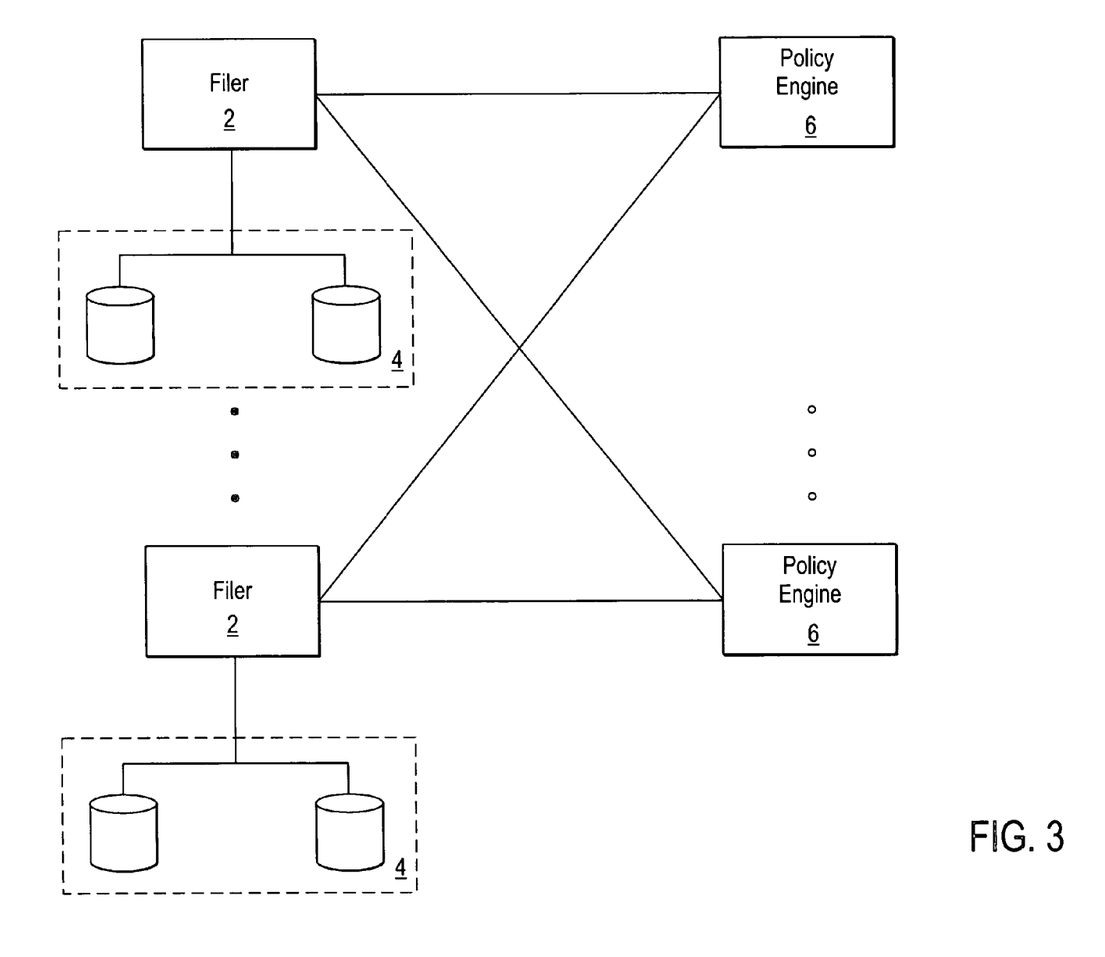
FIG. 3 shows multiple policy engines connected to multiple filers.

A policy engine 6 such as described herein can be used to control operations of multiple storage servers (e.g., multiple filers 2), as illustrated in FIG. 3. Accordingly, a policy implemented by the policy engine 6 can be defined to be specific to a certain filer or filers 2. Similarly, the outcome of applying a policy in the policy engine 6 for a particular screen request may depend upon which particular filer 2 sent the screen request. For example, policies may be defined to apply a quota to a particular filer or group of filers 2, or users or clients 1 associated with a particular filer or filers 2. In this regard the information sent by a filer to a policy engine with a screen request may include an identifier of the filer. In a similar manner, the policy engine 6 can be used to provide secure access to certain data. For example, certain filers (and, hence, their associated users) may be permitted to access certain data while other filers (and, hence, their associated users) are denied access to the same data.

A policy engine 6 such as described herein can be implemented as a cluster device within a cluster, as described in Muhlestein, or the policy engine 6 can be implemented as a cluster. The cluster device or a policy engine 6 within a cluster can be selected by the filer 2 in a round robin manner, for example. Also, as illustrated FIG. 3, multiple independent policy engines 6 can be used as described above to control operations of multiple filers 2. In some implementations, each filer 2 may be statically assigned to a particular policy engine 6. In other implementations, the policy engine 6 which responds to a particular screen request may be determined dynamically based on any of various criteria, such as load balancing considerations, or it may be selected in a round robin manner by the requesting filer 2.

In certain embodiments, multiple policies are implemented in a logic AND fashion to implement an overall policy. In certain embodiments, policies can be linked in a more complex policy expression, for example by ORing or XORing two or more policies to create a more complex expression.

The policy engine 6 can be distributed amongst multiple nodes (e.g., multiple physical machines/platforms). Accordingly, a particular policy may be distributed amongst multiple nodes. Each node may implement different policies and/or each node may implement a portion of a total policy. Additionally, information from intermediate policy engines can be used as inputs to systems for evaluation and enforcement In the case of a multiple-node policy engine, for example, one part of the policy engine can reside in the filer 2, while the other part or parts reside externally to the filer 2. In that case the portion of the policy engine 6 residing in the filer 2 may still be external to all other processes of the filer, in that such portion of the policy engine is not linked into any executables of the filer 2, either statically or dynamically.

The distribution of policies is advantageous in that it can reduce necessary bandwidth between nodes and reduce the complexity of each node. In certain embodiments, a two-node policy engine is used to distribute implementation of a policy asymmetrically. The portion of the policy engine 6 which resides on the filer 2 can be relatively simple, providing high-performance decisions regarding the file system and/or filtering "uninteresting" events, while the off-filer part of the policy engine 6 would deal with more complex decisions and/or multiple-filer views.

The above-described communications between a filer 2 and a policy engine 6 can be implemented with the help of interface definition language (IDL) files, which are platform-independent representations of data as exchanged between two machines. Certain embodiments of the invention employ two IDLs, referred to as fprequest.idl and fpcompletion.idl. Fprequest.idl describes the RPC calls made by the filer 2 to the policy engine 6, i.e., the screen request RPCs.

Screen Request RPCs

In certain embodiments of the invention, the following calls are implemented by the policy engine 6; they are initiated from a filer 2 at the time screening of the file operation is requested:

| | | |
|---|---|---|
| FP_ScreenRequest( ) | | Send data concerning a proposed file access to the policy engine for filtering. |
| [in] handle_t FilerHandle | | Opaque RPC binding handle furnished during the registration process. |
| [in] DWORD FilerID | | Integer ID assigned by policy engine during registration process |
| [in] DWORD RequestID | | Filer's request ID |
| [in, string] wchar_t* ClientIP | | IP address of client attempting to access the file |
| [in, string] wchar_t* UserSid | | SID of the client attempting to access the file. SID uses the notation: S-R-I-S-S ... In this notation, S identifies the series of digits as an SID, R is the revision level, I is the identifier-authority value, S is subauthority value(s). An SID could be written in this notation as follows: S-1-5-32-544 In this example, the SID has a revision level of 1, an identifier-authority value of 5, first subauthority value of 32, second subauthority value of 544. Note that the above SID represents the local Administrators group. |
| [in] DWORD ClientOperation | | Operation being attempted on file. |
| | Symbol value | Code | Operation type |
| | FS_OP_OPEN | 0x0001 | File opens |
| | FS_OP_CREATE | 0x0002 | File creates |
| | FS_OP_RENAME | 0x0004 | File renames |
| | FS_OP_CLOSE | 0x0008 | File closes (CIFS only) |
| | FS_OP_DELETE | 0x0010 | File deletes |
| | FS_OP_RMDIR | 0x0020 | Directory deletes |
| | FS_OP_RENAME_DIR | 0x0040 | Directory renames |
| | FS_OP_ALL_OPS | 0x007F | All operations |
| [in] DWORD ClientOperation | | Operation being attempted on file. |
| | Symbol value | Code | Operation type |
| | FS_OP_OPEN | 0x0001 | File opens |
| | FS_OP_CREATE | 0x0002 | File creates |
| | FS_OP_RENAME | 0x0004 | File renames |
| | FS_OP_CLOSE | 0x0008 | File closes (CIFS only) |
| | FS_OP_DELETE | 0x0010 | File deletes |
| | FS_OP_RMDIR | 0x0020 | Directory deletes |
| | FS_OP_RENAME_DIR | 0x0040 | Directory renames |
| | FS_OP_ALL_OPS | 0x007F | All operations |
| [in] DWORD UID | | This fields sends the process or user ID in it as an aid to detecting "runaway processes". |
| [in] DWORD AccessValid | | Non-zero if DesiredAccess is filled in. |
| [in] DWORD DesiredAccess | | Requested access mode, as passed into the CreateFile( ) Win32 API, e.g. GENERIC_READ, GENERIC_WRITE. |
| [in] DWORD DispositionValid | | Non-zero if CreateDisposition is filled in. |
| [in] DWORD CreateDisposition | | Requested create mode, as passed into the CreateFile( ) Win32 API by the originating client, e.g. CREATE_NEW, OPEN_EXISTING, etc. |
| [in, string] wchar_t* DisplayPath | | UNC path to file (e.g. \\filer\home\smc\doc\my.doc). |

-continued

| | |
|---|---|
| [in, string] wchar_t* AccessPath | Path to the file on the filer (e.g. \\filer\ONTAP_ADMIN$\vol\vol0\home\smc\doc\my.doc). Use this path to open the file for inspection or stat'ing during a screen request. |
| [in, string] wchar_t* RenameDisplayPath | Proposed new name for file during a rename, suitable for display to a client, as in DisplayPath. Meaningless except for rename operations. |
| [in, string] wchar_t* RenamePath | Proposed new name for file during a rename, suitable for opening by server, as in AccessPath. Meaningless except for rename operations. |
| FP_ServerStatus ( ) | Find out whether a policy engine is alive and well. If it is not, or if there is no reply to this RPC, the filer will automatically remove the policy engine from the list of policy engines. |
| [in] handle_t FilerHandle [in] DWORD FilerID | As above. |
| FP_RequestStatus ( ) | Get status on an individual request. If the policy engine is working on it, OK, but otherwise, try sending the request to another policy engine if one is available. Otherwise, follow the policy set by "Fpolicy ™ options required". If "required" is true, fail the request, otherwise allow it. |
| [in] handle_t FilerHandle, [in] DWORD FilerID, [in] DWORD RequestID, [in, string] wchar_t* AccessPath, [out] DWORD* RequestStatus | All fields match the values in the original request that is being checked on. A return value of zero means that no progress has been made. Anything else means "still working on it". |
| FP_ShutdownCP( ) | Shut down operations. This RPC is normally issued before CIFS is terminated. |
| [in] handle_t FilerHandle [in] DWORD FilerID | As above. |

Screen Completion RPCs

The following APIs are implemented on the filer, and are called by the policy engine.

| | |
|---|---|
| FP_ScreenCompletion( ) | Tell the filer whether or not to allow access to the file. |
| [in] handle_t FilerHandle | The policy engine returns status back to the filer. |
| [in] DWORD RequestID | You should return standard NT error codes, such |
| [in] DWORD Status | as 0x05 for Access Denied, or zero for success. |
| [in, string] wchar_t* AccessPath [in, string] wchar_t* StatusStr | In the event that the policy engine fails the request, a human readable explanation, suitable for the filer logs, of why the access failed should be returned in the StatusStr field. |
| FP_Registration ( ) | Register self with a filer as an available policy engine. |
| [in] handle_t FilerHandle | Opaque handle to filer gotten during initial RPC binding process. |
| [in] DWORD FilerID | Filer ID, created by policy engine. This allows convenient identification of which filer is sending the request, if the policy engine has registered with more than one filer. |
| [in] DWORD ServerType | Currently SCANTYPE_fscreen is the only allowed value here (see scantype.h) |
| [in] DWORD OpsToScreen | OR'ed combination of FP_OP_OPEN, FP_OP_RENAME, etc. (see fpserver.h). This tells the filer which operations the policy engine wishes to screen. Note that if one policy engine registers to screen ops A and B, while another registers to screen C, the filer will select the appropriate server depending on which operation comes in from a client. |
| [in] DWORD Reserved | Currently unused |
| [in, string] wchar_t* PolicyName | Whatever policy name is declared on the filer that the server is going to serve for ("default", for example) |
| [in, string] wchar_t* OptionalParams | Currently unused |
| FP_OpsToScreen ( ) | Tell the filer which operations (e.g., open, rename and/or create) to screen |

| | -continued |
|---|---|
| [in] handle_t FilerHandle,<br>[in] DWORD OpsToScreen,<br>[in] DWORD Reserved<br>FP_ShutdownRQ( ) | Set OpsToScreen to an OR'ed combination of<br>FP_OP_OPEN, FP_OP_RENAME, etc. (see<br>fpserver.h)<br>Ask for permission to no longer scan for files. If<br>you simply disconnect without asking permission,<br>one or more files which the filer has decided your<br>policy engine should process may not be screened.<br>Waiting until this RPC completes<br>means the filer has emptied the queue for this<br>policy engine and done the right things. |
| [in] handle_t FilerHandle<br>FP_FilerStatus( )<br>[in] handle_t FilerHandle | Find out if the filer is alive and well. In the event<br>of a reboot or takeover event, it is necessary to<br>register again, so pinging this interface when no interaction<br>has taken place for some time is prudent. |

In certain situations it may be desirable to store some files (or other data) managed by a filer 2 remotely from the filer 2, such as in a separate nearline storage device, instead of in the filer's local storage. Where a file is stored may be determined by a separate data backup application. A policy engine 6 such as described above can be advantageous in situations where files managed by a filer 2 are stored remotely from the filer 2, as will now be described.

In certain embodiments, remotely stored files are replaced in the filer 2 by a "stub" (e.g., a header), and the inode of such a file includes a flag (e.g., an "offline" bit) indicating that the file is actually stored remotely. When the filer 2 receives a request relating to such a file, the filer 2 detects this flag in the inode of the file and responds by sending a corresponding notification to the policy engine 6. In response to this notification, the policy engine 6 obtains the file from the remote storage (if appropriate after applying any applicable policies), and provides the file to the filer 2. The filer 2 then uses the file as appropriate to satisfy the client request.

Figure 4:
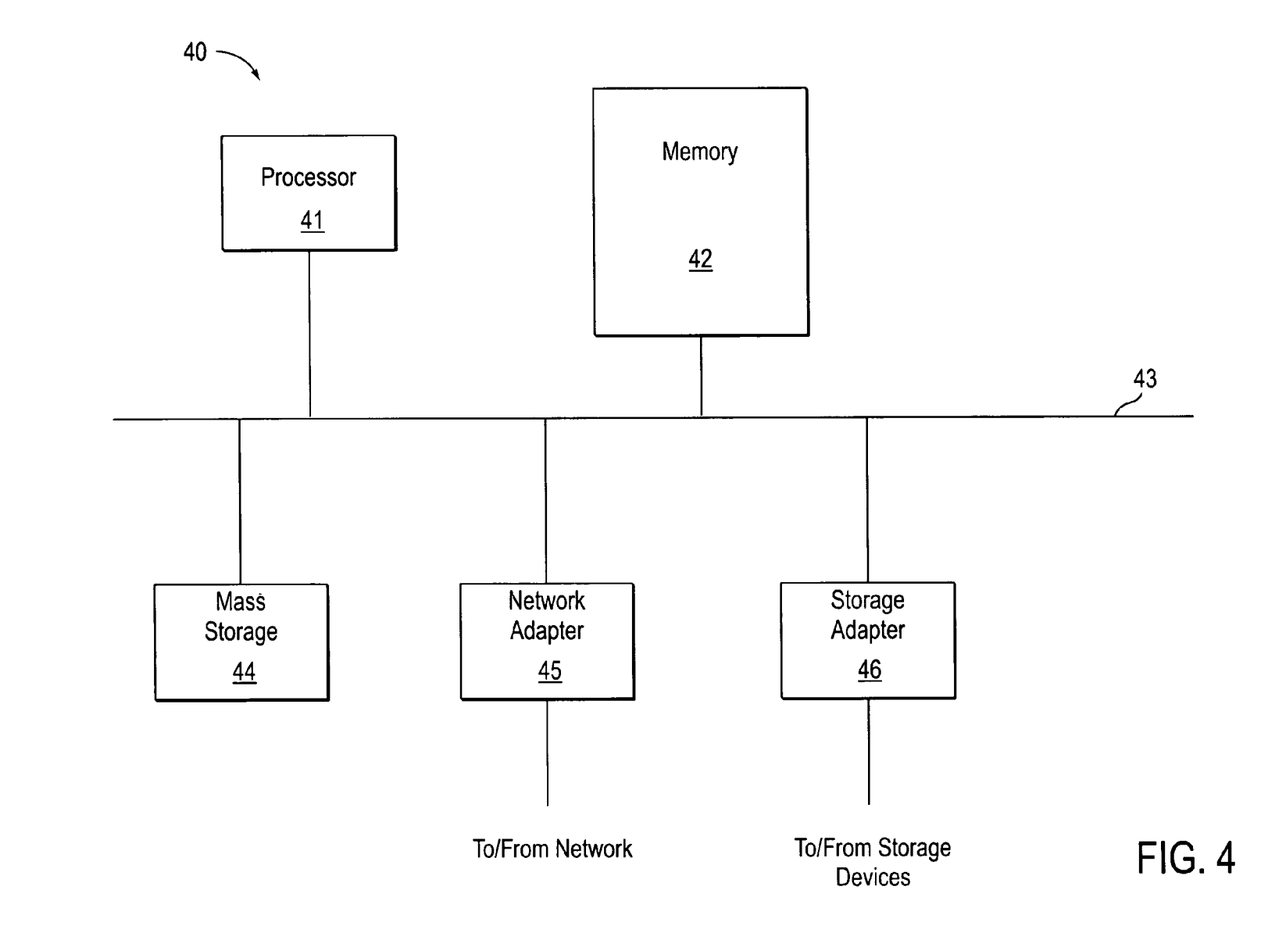
FIG. 4 is a high-level block-diagram of the hardware architecture of a processing system representative of a filer or a policy engine.

FIG. 4 shows at a high-level the hardware architecture of a processing system representative of a filer 2 or a policy engine 6 such as described above, according to certain embodiments of the invention. Certain standard and well-known components which are not germane to the present invention may not be shown. The processing system 40 includes one or more processors 21 and memory 42, coupled together by a bus system 43. The bus system 43 is an abstraction that represents any one or more separate physical buses and/or point-to-point connections, connected by appropriate bridges, adapters and/or controllers. The bus system 43, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 41 is the central processing unit (CPU) of the processing system 40 and, thus, controls the overall operation of the processing system 40. In certain embodiments, the processor 41 accomplishes this by executing software stored in memory 42. The processor 41 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 42 represents any form of random access memory (RAM), read-only memory (ROM), flash memory, or a combination thereof. Memory 42 stores, among other things, the operating system of the processing system 40, in which techniques of the present invention can be implemented.

Also connected to the processor 41 through the bus system 43 are (optionally) a mass storage device 44, a network adapter 45 and (at least in the case of a filer) a storage adapter 46. Mass storage device 44 may be or include any conventional medium for storing large volumes of data in a non-volatile manner, such as one or more disks. The network adapter 45 provides the processing system 40 with the ability to communicate with remote devices, such as clients and/or a filer, over a network and may be, for example, an Ethernet adapter. The storage adapter 46 allows a filer to access external mass storage devices and may be, for example, a Fibre Channel adapter or SCSI adapter.

Thus, a method and apparatus for controlling the servicing of requests received by a storage server have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

receiving at a network storage server, from a network storage client, a client request to perform an operation relating to a data set stored by the network storage server;

in response to receiving the client request, determining in the network storage server whether to invoke a policy engine in relation to the client request, by determining whether the client request satisfies a specified criterion associated with a specified policy of the policy engine;

if the client request is determined not to satisfy a specified criterion associated with a specified policy of the policy engine, then satisfying the client request by the network storage server without invoking the policy engine; whereas if the client request is determined to satisfy a specified criterion associated with a specified policy of the policy engine, then sending a screen request corresponding to the client request from the network storage server to the policy engine to cause the policy engine to apply the specified policy in relation to the client request or the data set;

receiving at the network storage server, from the policy engine, a screen response indicating a result of the policy engine having applied the specified policy in relation to the client request or the data set; and sending a response to the client request from the network storage server to the network storage client in accordance with the screen response.

2. A method as recited in claim 1, wherein the policy engine is implemented as a dedicated application server separate from the network storage server.

3. A method as recited in claim 1, further comprising: sending information relating to the data set to the policy engine with the screen request.

4. A method as recited in claim 3, wherein the information relating to the data set comprises metadata of the data set.

5. A method as recited in claim 1, wherein the screen request comprises a remote procedure call (RPC).

6. A method as recited in claim 1, wherein the network storage server and at least a portion of the policy engine are implemented in a single physical platform.

7. A method as recited in claim 1, wherein the client request is a request for a file managed by the network storage server.

8. A method as recited in claim 1, wherein the policy engine determines whether to approve or deny the screen request based on an identity of the network storage client.

9. A method as recited in claim 1, wherein the policy engine determines whether to approve or deny the screen request based on an identity of a user of the network storage client.

10. A method as recited in claim 1, wherein the policy engine determines whether to approve or deny the screen request based on an identity of the network storage server.

11. A method as recited in claim 1, wherein the policy engine determines whether to approve or deny the screen request based on a quota.

12. A method as recited in claim 1, wherein the policy engine determines whether to approve or deny the screen request based on a number of times the data set has been accessed during a period of time.

13. A method as recited in claim 1, further comprising:
using one of a plurality of storage protocols implemented by the network storage server to access the set of data, the plurality of storage protocols including a block-level storage protocol and a file-level storage protocol.

14. A system comprising:
a network storage server; and
a policy engine, implemented as a dedicated application server separate from the network storage server, coupled to communicate with the network storage server;
wherein the network storage server is configured to
receive a client request, from a network storage client, to perform an operation relating to a data set stored by the network storage server;
determine whether to invoke a policy engine, in response to receiving the client request, by determining whether the client request satisfies a specified criterion associated with a specified policy of the policy engine;
satisfy the client request, without invoking the policy engine, if the client request is determined not to satisfy a specified criterion associated with a specified policy of the policy engine;
invoke the policy engine, if the client request is determined to satisfy a specified criterion associated with a specified policy of the policy engine, by sending a screen request, corresponding to the client request, to the policy engine;
wherein the policy engine is configured to
receive the screen request from the network storage server; wherein the screen request is configured to cause the policy engine to apply the specified policy in relation to the client request or the data set; and
send a screen response indicating a result of the policy engine having applied the specified policy in relation to the client request or the data set;
receive the screen response from the policy engine; and
send a response to the network storage client in accordance with the screen response.

15. A system as recited in claim 14, wherein the network storage server is further configured to:
send information relating to the data set to the policy engine with the screen request.

16. A system as recited in claim 15, wherein the information relating to the data set comprises metadata of the data set.

17. A system as recited in claim 14, wherein the screen request comprises a remote procedure call (RPC).

18. A system as recited in claim 14, wherein the client request is a request for a file managed by the network storage server.

19. A system as recited in claim 14, wherein the policy engine is further configured to determine whether to approve or deny the screen request based on an identity of the network storage client.

20. A system as recited in claim 14, wherein the policy engine is further configured to determine whether to approve or deny the screen request based on an identity of a user of the network storage client.

21. A system as recited in claim 14, wherein the policy engine is further configured to determine whether to approve or deny the screen request based on an identity of the network storage server.

22. A system as recited in claim 14, wherein the policy engine is further configured to determine whether to approve or deny the screen request based on a quota.

23. A system as recited in claim 14, wherein the policy engine is further configured to determine whether to approve or deny the screen request based on a number of times the data set has been accessed during a period of time.

24. A system comprising:
a plurality of network storage servers; and
a plurality of policy engines, each coupled to communicate with each of the network storage servers;
wherein each of the network storage servers is configured so that, in response to receiving a client request to perform an operation relating to a stored data set, the network storage server responds by
determining whether at least one of the policy engines should be invoked in relation to the client request, by determining whether the client request satisfies a specified criterion associated with a specified policy of at least one of the policy engines;
if the client request is determined not to satisfy a specified criterion associated with a specified policy of at least one of the policy engines, the network storage server responds by satisfying the client request; whereas
if the client request is determined to satisfy a specified criterion associated with a specified policy of at least one of the policy engines, the network storage server responds by
sending a screen request corresponding to the client request from the network storage server to at least one of the policy engines to cause at least one of the policy engines to apply a specified policy in relation to the client request or the data set;

receiving at the network storage server a screen response indicating a result of applying the specified policy; and sending a response to the client request from the network storage server to a network storage client in accordance with the screen response.

25. A system as recited in claim 24, wherein the network storage server is configured to select a particular one or more of the policy engines which should be invoked in response to determining that at least one of the policy engines should be invoked.

26. A system as recited in claim 25, wherein the network storage server stores a plurality of specified criteria associated with a corresponding plurality of specified policies, and wherein the network storage server is configured to select at least one of the policy engines which should be invoked, based on which one or more of the specified criteria are satisfied by the client request.

27. A system as recited in claim 25, wherein the network storage server is configured to select at least one of the policy engines which should be invoked based on a round-robin selection scheme.

28. A system as recited in claim 25, wherein the network storage server is configured to select at least one of the policy engines which should be invoked based on a load-balancing scheme.

29. A system as recited in claim 24, wherein each of the policy engines is dedicated to applying a different set of one or more policies.

30. A system as recited in claim 24, wherein at least one of the policy engines is configured to apply a specified policy in a manner that is dependent on which network storage server received the client request.

31. A system as recited in claim 24, wherein at least one of the policy engines is configured to determine whether to apply a particular specified policy based on which network storage server received the client request.

32. A system as recited in claim 24, wherein at least one of the policy engines applies a specified policy based on an identity of a client which sent the client request.

33. A system as recited in claim 24, wherein the plurality of policy engines are implemented as a cluster.

34. A system as recited in claim 24, wherein at least one of the policy engines comprises a cluster.

* * * * *